(12) United States Patent
Kim et al.

(10) Patent No.: US 6,600,468 B1
(45) Date of Patent: Jul. 29, 2003

(54) SYSTEM FOR MEASURING MODULATION TRANSFER FUNCTION AND METHOD FOR EVALUATING IMAGE QUALITY OF COLOR LIQUID CRYSTAL DISPLAYS USING THE SYSTEM

(75) Inventors: Tae-hee Kim, Suwon (KR); Yun-woo Lee, Taejeonkwungyeok (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 87 days.

(21) Appl. No.: 09/676,489

(22) Filed: Oct. 2, 2000

(30) Foreign Application Priority Data

Apr. 28, 2000 (KR) ........................................ 2000-22805

(51) Int. Cl.[7] ................................................ G09G 3/36
(52) U.S. Cl. ........................... 345/87; 345/50; 324/770; 348/191
(58) Field of Search ...................... 324/770; 348/180, 348/181, 182, 183, 184, 185, 186, 187, 188, 189, 190, 191, 192, 193, 194; 345/87, 50

(56) References Cited

U.S. PATENT DOCUMENTS

| | | | | |
|---|---|---|---|---|
| 4,241,996 A | * | 12/1980 | Weiser ..................... | 356/124.5 |
| 5,032,769 A | * | 7/1991 | Kawakami ............. | 315/368.11 |
| 5,140,418 A | * | 8/1992 | Rivamonte ................. | 348/185 |
| 5,572,444 A | * | 11/1996 | Lentz et al. ................ | 702/117 |
| 5,650,844 A | * | 7/1997 | Aoki et al. ............. | 356/237.2 |
| 5,664,158 A | * | 9/1997 | Larimer ........................ | 703/23 |
| 5,686,959 A | * | 11/1997 | Hayashi et al. ............. | 348/126 |
| 5,696,550 A | * | 12/1997 | Aoki et al. ................. | 348/125 |
| 5,793,221 A | * | 8/1998 | Aoki ........................... | 324/770 |
| 5,969,756 A | * | 10/1999 | Buckley et al. ............ | 348/190 |
| 6,069,691 A | * | 5/2000 | Rosow et al. ............ | 356/124.5 |
| 6,219,099 B1 | * | 4/2001 | Johnson et al. ............. | 348/383 |

OTHER PUBLICATIONS

Y. Ohno & A.E. Thompson, Photometry—The CIE V($\lambda$) Function and What can be Learned from Photometry, Measurements Optical Radiation Hazards —A Reference Book . . . , Sep. 1–3, 1998, Gaithersburg, Maryland, ICNIRP 6/98, CIEx016–1998, 445–453.*

Microsoft Press Computer Dictionary, 3rd Ed. 1997, p. 20.*

Carlo Infante, "On the Modulation Transfer Function of Matrix Displays," J.Soc.Inf.Disp., 1/4, (1993), pp. 449–450.*

The New IEEE Standard Dictionary of Electrical and Electronics Terms, 5th Ed., 1993, p. 1222.*

"Optical Engineering", vol. 38, No. 10, ISSN 009–13286, Oct. 1999.

* cited by examiner

Primary Examiner—Steven Saras
Assistant Examiner—Leland Jorgensen
(74) Attorney, Agent, or Firm—Sughrue Mion, PLLC

(57) ABSTRACT

A method for evaluating the image quality of a color liquid crystal display (LCD), and a system for measuring the modulation transfer function (MTF) for use in the evaluation of the image quality. The image quality evaluation method involves measuring the MTF at a predetermined position on the screen of an LCD, and the image quality is evaluated using the measured MTF. The MTF measuring system, which includes a linear charge coupled device (CCD) camera equipped with a V($\lambda$) filter, is able to accurately measure the image quality of a color LCD by setting the measuring conditions through computer simulation. In addition, the resolution and signal-to-noise characteristics of an image displayed on the screen can be evaluated based on the measured MTF. Also, the problem of truncation of the line spread function (LSF) can be solved by fixing the scanning width. The spectral response characteristics of detectors can be made like those of the human eye using the V($\lambda$) filter. The MTF measurement can be effectively used in evaluating the image quality of color CRTs.

6 Claims, 12 Drawing Sheets

| LCD | FLM-102 (SAMPLE A) | 8500T-1281X (SAMPLE B) |
|---|---|---|
| DISPLAY AREA | 10.4 INCH (DIAGONAL) | |
| NUMBER OF PIXELS | 800×600 DOTS | |
| CENTER-TO-CENTER DISTANCE OF TWO NEIGHBORING PIXELS OF THE SAME COLOR ($\mu m \times \mu m$) | 284×284 | 307×307 |
| APERTURE RATIO | 70% | 64% |
| COLOR PIXEL ARRANGEMENT | FINE VERTICAL STRIPE | |

| DETECTOR | WEIGHTING FACTOR | | |
|---|---|---|---|
| | RED PIXEL | GREEN PIXEL | BLUE PIXEL |
| CCD | 0.514 | 1.0 | 0.760 |
| HUMAN EYE | 0.405 | 1.0 | 0.148 |
| CCD CAMERA WITH V($\lambda$) FILTER | 0.405 | 1.0 | 0.148 |

FIG. 13

| SAMPLE A | | | | | SAMPLE B | | | |
|---|---|---|---|---|---|---|---|---|
| POSITION | | | MTFA | | POSITION | | MTFA | |
| NO. | CONTRAST | BRIGHTNESS | VERTICAL DIRECTION | HORIZONTAL DIRECTION | NO. | CONTRAST | VERTICAL DIRECTION | HORIZONTAL DIRECTION |
| C1B1 | MINIMUM | MINIMUM | 10.34 | 10.50 | C1 | MAXIMUM×0.0 | 17.42 | 19.77 |
| C1B2 | MINIMUM | MEDIUM | 10.35 | 10.51 | C2 | MAXIMUM×0.25 | 18.18 | 20.07 |
| C1B3 | MINIMUM | MAXIMUM | 10.36 | 10.53 | C3 | MAXIMUM×0.5 | 18.27 | 20.39 |
| C2B1 | MEDIUM | MINIMUM | 13.66 | 14.48 | C4 | MAXIMUM×0.78 | 18.66 | 21.01 |
| C2B2 | MEDIUM | MEDIUM | 13.67 | 14.50 | C5 | MAXIMUM×1.0 | 19.02 | 21.38 |
| C2B3 | MEDIUM | MAXIMUM | 13.81 | 15.11 | | | | |
| C3B1 | MAXIMUM | MINIMUM | 19.71 | 22.20 | | | | |
| C3B2 | MAXIMUM | MEDIUM | 19.72 | 22.21 | | | | |
| C3B3 | MAXIMUM | MAXIMUM | 19.85 | 22.49 | | | | |

FIG. 14

| POSITION ON THE SCREEN | SAMPLE A | | SAMPLE B | |
|---|---|---|---|---|
| | VERTICAL DIRECTION | HORIZONTAL DIRECTION | VERTICAL DIRECTION | HORIZONTAL DIRECTION |
| TOP LEFT | 18.37 | 20.71 | 18.73 | 21.75 |
| TOP RIGHT | 19.83 | 22.25 | 19.01 | 21.82 |
| CENTER | 19.60 | 22.11 | 19.02 | 21.38 |
| BOTTOM LEFT | 18.90 | 21.02 | 18.79 | 21.43 |
| BOTTOM RIGHT | 19.85 | 22.51 | 18.80 | 21.44 |
| MEAN MTFA | 19.36 | 21.80 | 18.87 | 21.58 |
| UNIFORMITY | 93% | 92% | 98% | 98% |

MTFA

SYSTEM FOR MEASURING MODULATION TRANSFER FUNCTION AND METHOD FOR EVALUATING IMAGE QUALITY OF COLOR LIQUID CRYSTAL DISPLAYS USING THE SYSTEM

BACKGROUND OF THE INVENTION

1. Field of the Invention

The present invention relates to a method for evaluating the image quality of color liquid crystal displays, and more particularly, to a method for evaluating the image quality of color liquid crystal displays by measuring the modulation transfer function (MTF), and a system for measuring the MTF.

2. Description of the Related Art

Color liquid crystal displays (LCDs) have been widely used not only for computer displays but also for television displays, in place of conventional cathode ray tubes (CRTs) because of their portability. The resolution of LCDs is generally calculated from the modulation transfer function (MTF) formula with design data. In this formula, the luminance distribution of a dot is assumed to be a rectangular shape. Practically, however, the luminance distribution of a dot is not a perfect rectangular shape. Therefore, the following factors should be considered in evaluating the image quality of LCDs using the MTF formula: degradation of the image quality by unexpected spurious luminance patterns and chromatic noise, nonuniformity of the luminance distribution caused by optical characteristics, and defects introduced during production.

Usually, LCDs have contrast and brightness controls. Because the optimal image quality is determined by the contrast and brightness controls, there is a need to find how the combinations of the contrast and brightness levels influence the image quality.

Color LCDs emit a certain spectral distribution, which, together with the spectral response of the human eye, is associated with the luminance distribution. If a photodetector used to measure the luminance distribution is sensitive to color, there is a need to correct for a response difference between the human eye and the photodetector.

SUMMARY OF THE INVENTION

To solve the above problems, it is an objective of the present invention to provide a system for measuring the MTF for use in evaluating the image quality of color LCDs in consideration of parameters such as contrast and brightness, and a method for evaluating the image quality of color LCDs using the system.

According to an aspect of the present invention, there is provided a system for measuring an MTF for use in evaluating the image quality of color LCDs, the system comprising: an objective lens for magnifying a white dot on the screen of a color LCD to be tested; a charge coupled device (CCD) camera for capturing the luminance distribution of the white dot magnified by the objective lens; an analog-to-digital converter (ADC) for converting analog information of the luminance distribution of the white dot captured by the CCD camera to digital information; and a controller for correcting the magnification of the objective lens over the digital luminance distribution information of the white dot, and Fourier transforming the line spread function (LSF) according to the luminance distribution to measure the MTF.

The controller may be a computer.

Preferably, the CCD camera comprises a V(λ) filter for modifying the spectrum response characteristics of the CCD camera to closely approximate those of the human eye.

Preferably, the controller measures the MTF according to signal-to-noise (S/N) ratio in consideration of the background luminance (BL) of an image.

According to another aspect of the present invention, there is provided a method for evaluating the image quality of color LCDs, using a modulation transfer function algorithm (MTFA) at a predetermined position on the screen of an LCD.

BRIEF DESCRIPTION OF THE DRAWINGS

The above objective and advantages of the present invention will become more apparent by describing in detail preferred embodiments thereof with reference to the attached drawings in which:

FIG. 13 shows the MTFAs obtained from the measured MTFs; and

FIG. 14 comparatively shows the MTFAs at five positions on the screen.

DETAILED DESCRIPTION OF THE INVENTION

Figure 1A:
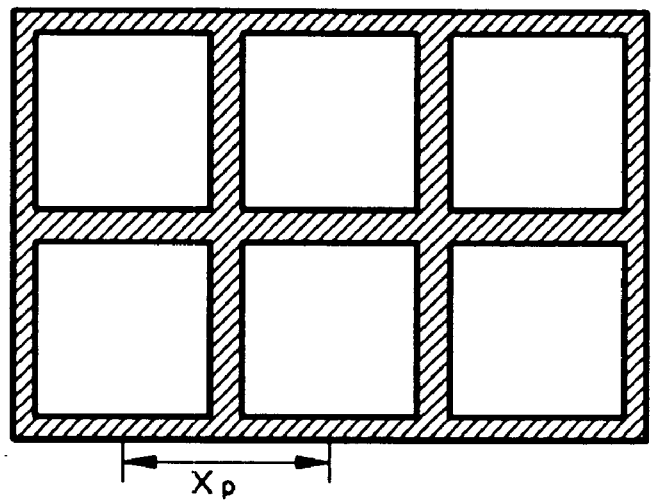
FIGS. 1A and 1B illustrate the arrangement of pixels in a monochrome LCD, and a color LCD with a fine vertical stripe configuration, respectively.
Figure 1B:
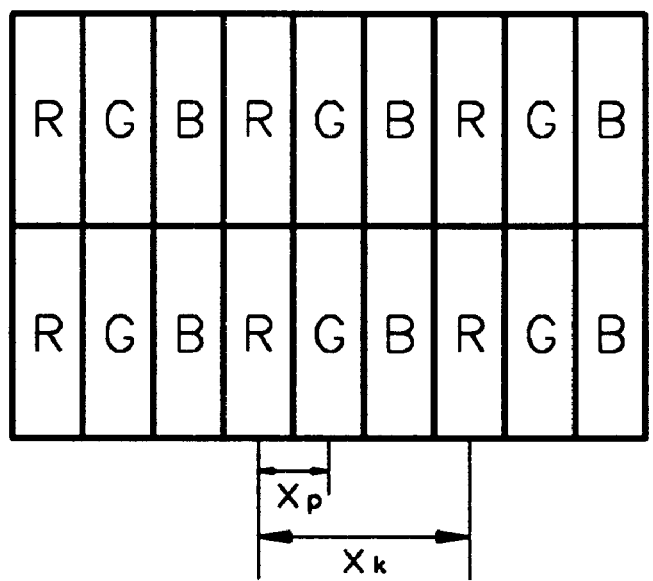

FIG. 1A shows the arrangement of pixels in a monochrome LCD, and FIG. 1B shows the arrangement of pixels in a color LCD with fine vertical stripe configuration. In FIGS. 1A and 1B, $X_p$ indicates the horizontal center-to-center distance between two neighboring pixels, and $X_k$ indicates the horizontal center-to-center distance between two pixels of the same color.

Formation of images by LCDs is characterized in two dimensions. For simplicity, we use 1-D notation in the following. From its definition, the modulation transfer function (MTF) of the display is given by $$MTF(v) = \left| \int_{-\infty}^{+\infty} l(x) \exp(-i2\pi vx) dx \right| \quad (1)$$

where v is the spatial frequency on the display in cycles per millimeter (cpm) and l(x) is the line spread function (LSF) obtained by integrating the luminance distribution of a displayed single white dot over the y-direction. The LSF is given by $$l(x) = 1, \quad -\frac{X}{2} \le x \le \frac{X}{2} \quad (2)$$

$$l(x) = 0, \quad x < -\frac{X}{2}, \quad x > \frac{X}{2} \quad (3)$$

where X for a monochrome LCD is $X_p$, i.e., the horizontal center-to-center distance between two neighboring pixels, as shown in FIG. 1A, and for a color LCD is $X_k$, i.e., the horizontal center-to-center distance between two pixels of the same color, as shown in FIG. 1B.

By substituting formulae (2) and (3) into formula (1), and normalizing at zero frequency, we get the MTF formula for LCDs as:

$$MTF(v) = \left| \frac{\sin \pi Xv}{\pi Xv} \right| \quad (4)$$

Figure 2A:
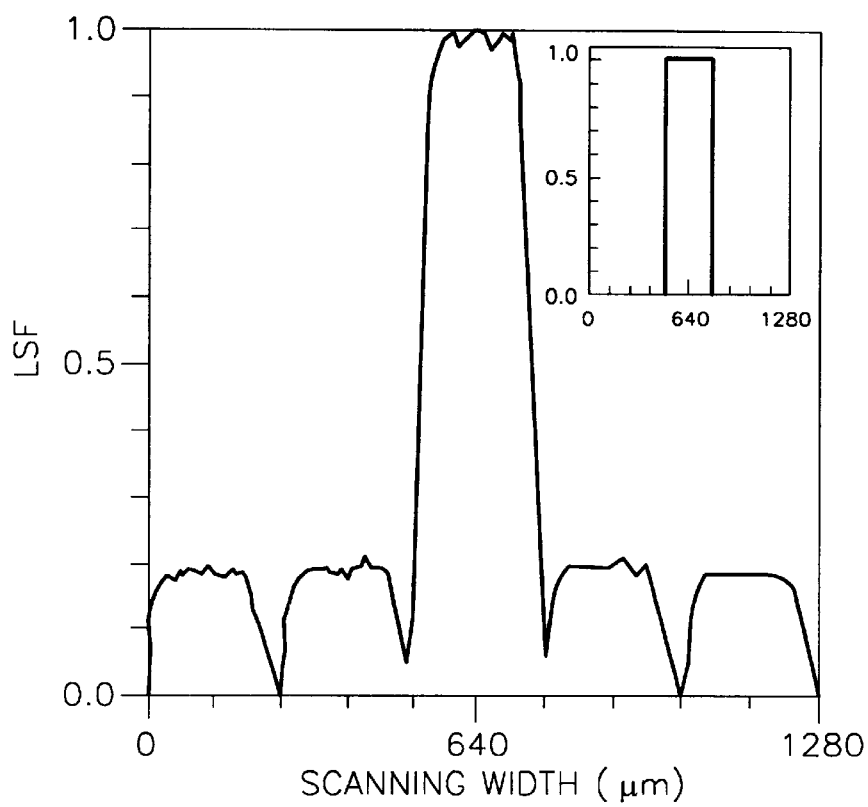
FIGS. 2A and 2B illustrate an example of the LSF measured in the vertical and horizontal directions, respectively.
Figure 2B:
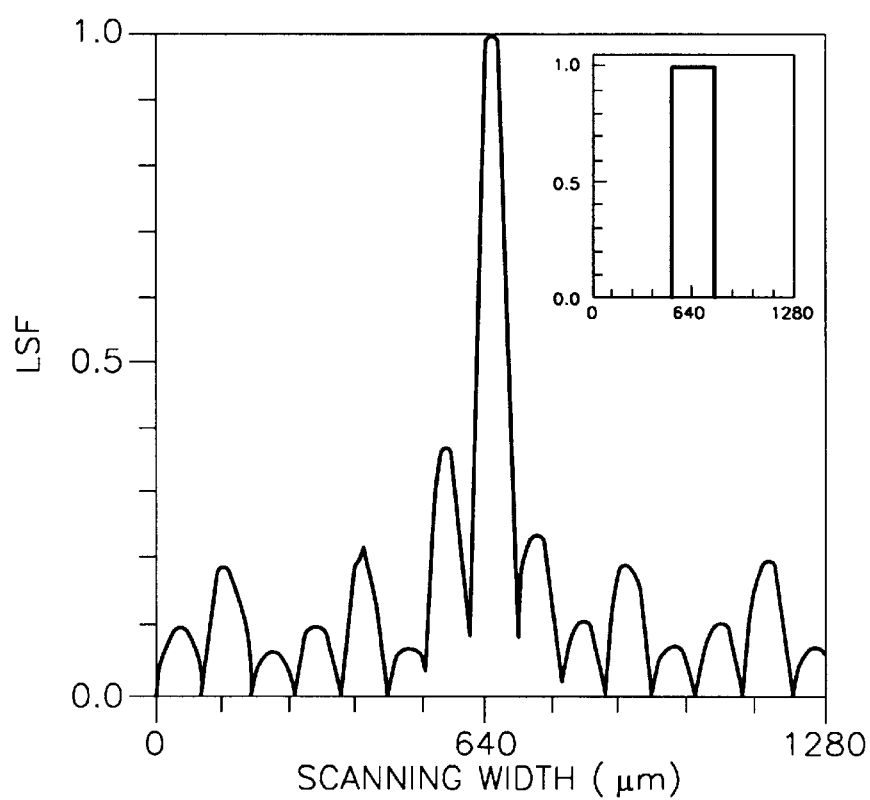

Measurement conditions are determined through the following computer simulation. FIGS. 2A and 2B illustrate an example of the LSFs measured in the vertical and horizontal directions, respectively.

If a white dot is displayed on a color LCD, unexpected spurious luminance patterns that lower the signal-to-noise ratio (SNR) are produced. In measuring the LSF, the scanning width should be at least three to five times the full width at half maximum (FWHM) of the LSF. For color LCDs with a fine vertical stripe configuration, as shown in FIG. 1B, the pixels are arranged in the vertical direction as R-R-R, G-G-G, and B-B-B. Thus, the LSF measured in this direction has one on-pixel corresponding to signal luminance (SL) and four off-pixels corresponding background luminance (BL), as shown in FIG. 2A. In the horizontal direction, the pixels are arranged as R-G-B, so the LSF measured in this direction has three on-pixels corresponding to SL and twelve off-pixels corresponding to BL, as shown in FIG. 2B. The insets in FIGS. 2A and 2B show the LSF of a rectangular shape assumed in the MTF formula. Because of the BL, we can see that the measured LSF has a lower SNR than the rectangular shape. The SNR is given by $$SNR = \frac{L_{SL} - L_{BL}}{L_{SL}} \quad (5)$$

where $L_{SL}$ and $L_{BL}$ are the average luminances of SL and BL, respectively.

Conventional MTF measurement does not provide sufficient information for the process of the BL. To represent the influence of the SNR by the MTF, we should know how to adequately process the BL of the LSF. In the present invention, the method of processing the BL of the LSF has been investigated by computer simulation. For this computer simulation, LSFs with three SNRs of 0.84, 0.90 and 0.97 were selected.

Figures 3, 4:
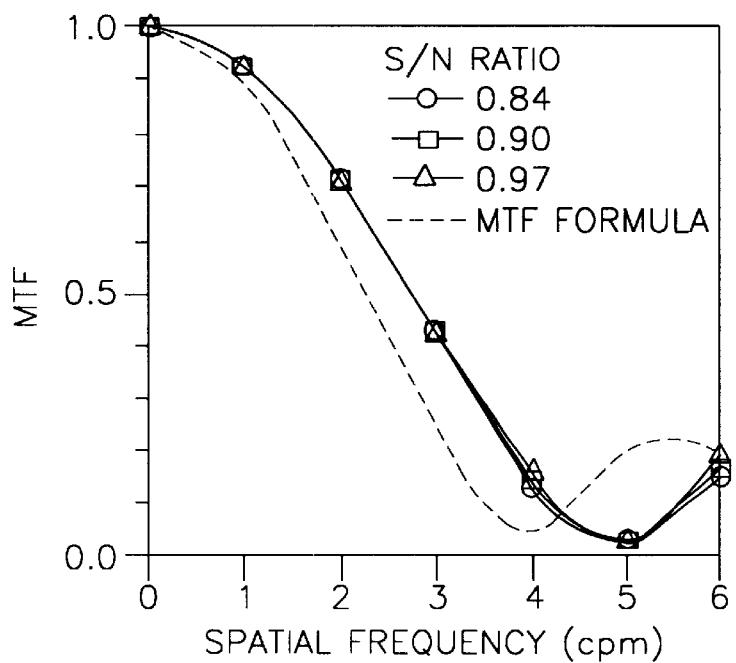
FIG. 3 illustrates the main specifications of two color LCDs tested.
FIG. 4 illustrates the MTFs obtained when BL is absent.
Figure 5:
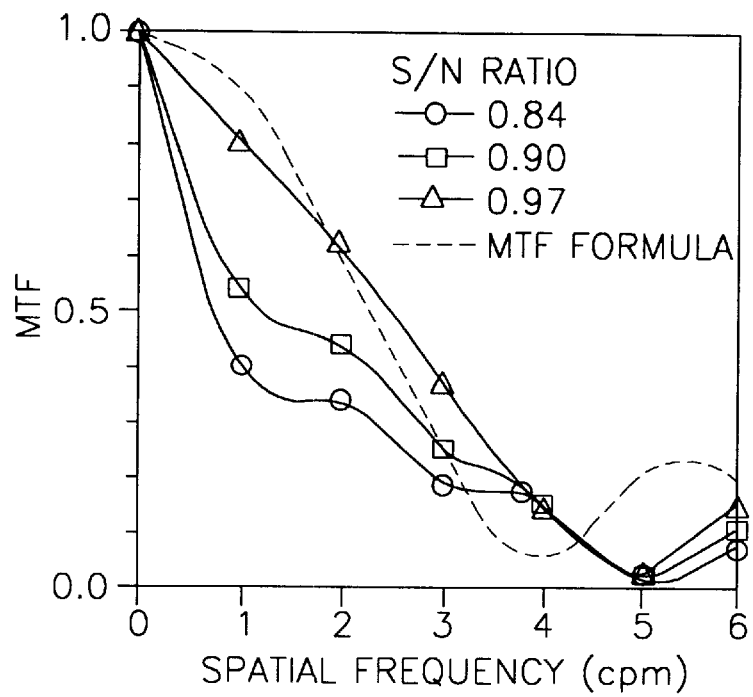
FIG. 5 illustrates the MTFs obtained by directly measuring the LSF in the presence of BL.

FIG. 3 illustrates the main specifications of two color LCDs used for the simulation. The LSFs were measured vertically for Sample A (FLM-102, LCD) listed in FIG. 3, and the contrast and brightness levels were varied to control the SNRs, respectively. Two different methods for processing the LSF were used. These are theoretically based on the computer simulation disclosed in an article entitled "MTF measurement of LCDs by a linear charge coupled device (CCD) imager 1. monochrome case," (Proc. SPIE 3134, 526–531(1997), by T. H. Kim, O. S. Choi, Y. W. Lee, H. M. Cho, and I. W. Lee). In particular, as for the first method applied when BL is absent, the BL is replaced by the average value and thus it is set to zero. The second method is used to actually measure LSFs in the presence of BL. The MTFs obtained using the first method are shown in FIG. 4. The dashed line represents the MTF calculated using formula (4). The MTF remains almost constant with respect to the variations of the S/N ratio. Therefore, the MTF is independent of the SNR. The MTFs obtained using the second method are shown in FIG. 5. As shown in FIG. 5, the MTF increases with a rising SNR. Thus, it can be noted that in the presence of BL, the MTFs are influenced by the SNR.

Figure 6:
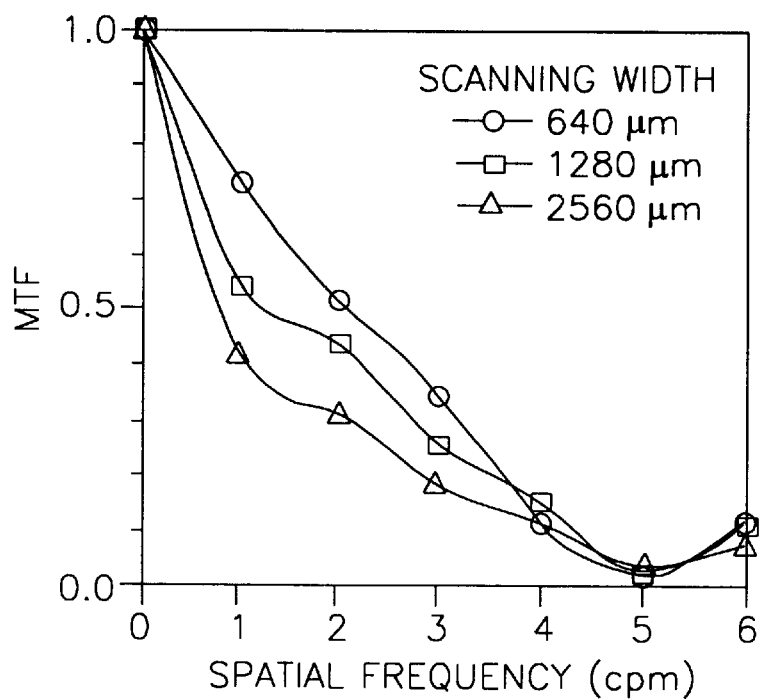
FIG. 6 illustrates the MTFs measured by the method of FIG. 5 with respect to scanning widths.

FIG. 6 illustrates the MTFs measured by the second method with respect to different scanning widths. Because BL extends over the entire screen of LCDs, the MTFs obtained using the second method, as shown in FIG. 6, are varied by the degree of truncation. As the scanning width increases, the MTF decreases. This is because the BL is widely distributed as previously mentioned. In the present embodiment, this problem has been solved by fixing the scanning width of the MTF measurement apparatus. In addition, the discrepancies between measured and calculated MTFs, as shown in FIGS. 5 and 6, occur because the shapes of the LSFs are different.

Figure 7:
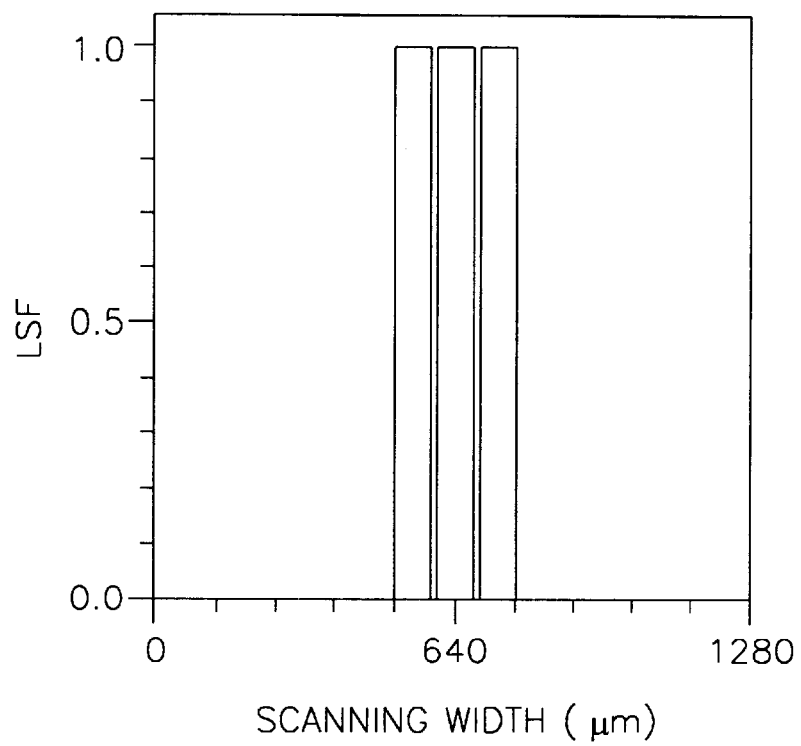
FIG. 7 illustrates an example of the LSF for computer simulation.

The influence of the spectral response of detectors on the MTF was simulated using the LSFs illustrated in FIG. 7. In FIG. 7, the rectangular shapes from the left correspond to the luminance distributions of red (R), green (G) and blue (B) pixels, respectively. Three types of detectors including a CCD, the human eye, and a CCD camera with V(λ) filter were used.

The simulation was performed as follows:

Step 1. To form the normalized spectral response curve, the spectral characteristics of an LCD and the detectors were multiplied.

Step 2. It was assumed that the light spectrum of the LCD has the primary wavelengths of R, G and B. Thus, the R, G and B pixels of the LCD have line spectra at 606, 550 and 475 nm, respectively.

Step 3. The normalized spectral response curve was approximated as the equivalent rectangular spectral response curves for the three primary wavelengths (refer to an article entitled "The Optical Transfer Function," American Elsevier Publishing Company, New York (1971), pp. 59–42, by K. R. Barnes).

Step 4. The heights of the rectangles obtained through the approximation are the weighting factors to be used for calculating the luminance distribution of LSF of corresponding pixel (refer to the article "The Optical Transfer Function", pp. 6–15).

Step 5. The MTF was obtained by Fourier transforming the weighted LSF.

Figure 8A:
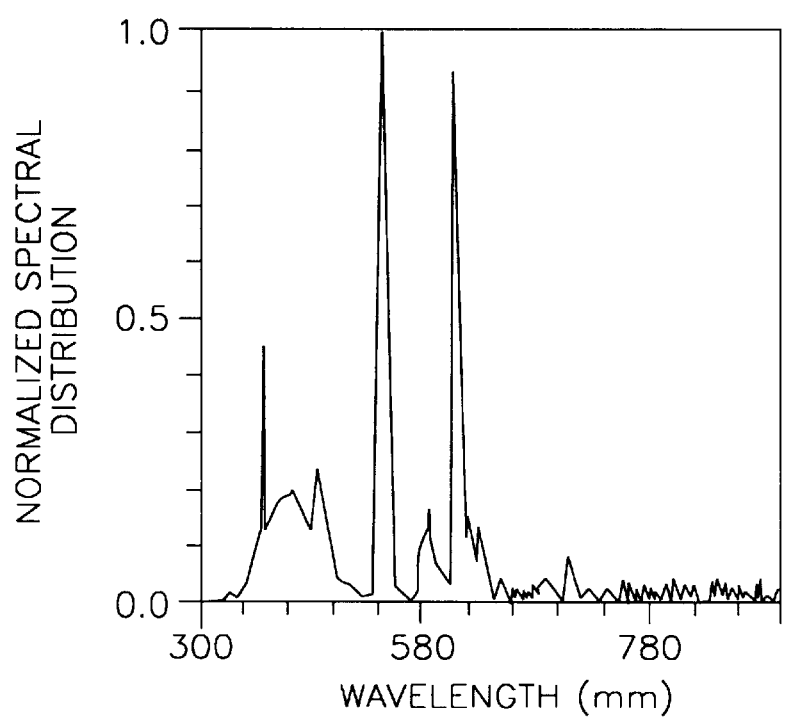
FIGS. 8A and 8B illustrate the spectral response characteristics of a LCD, and a CCD, the human eye and a V(λ) filter.
Figure 8B:
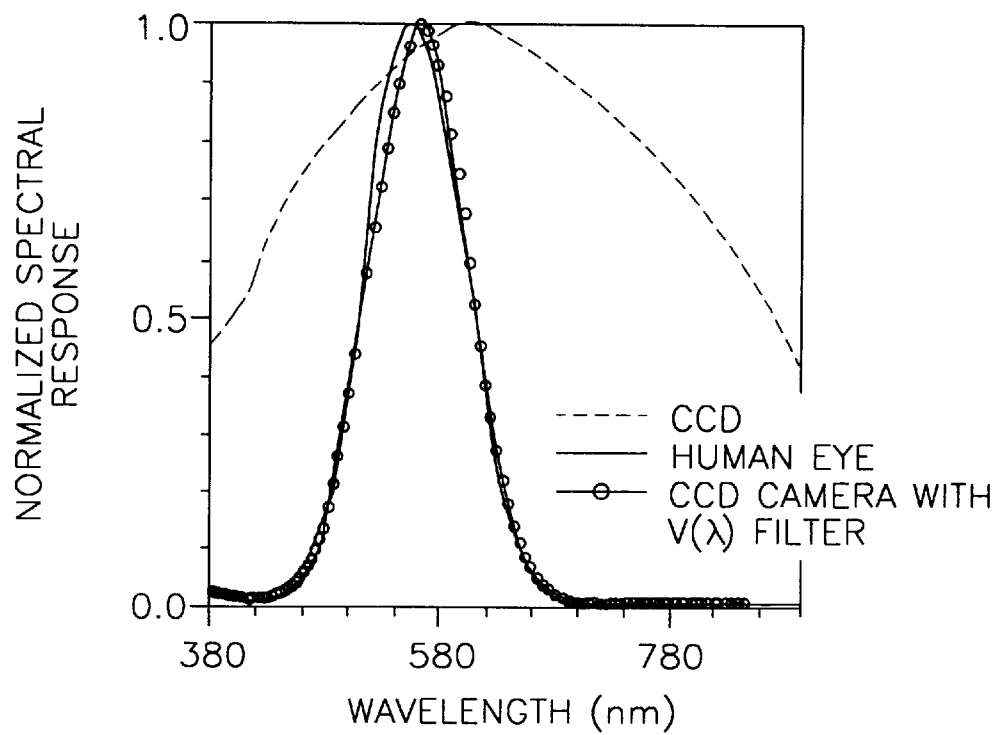
Figure 9A:
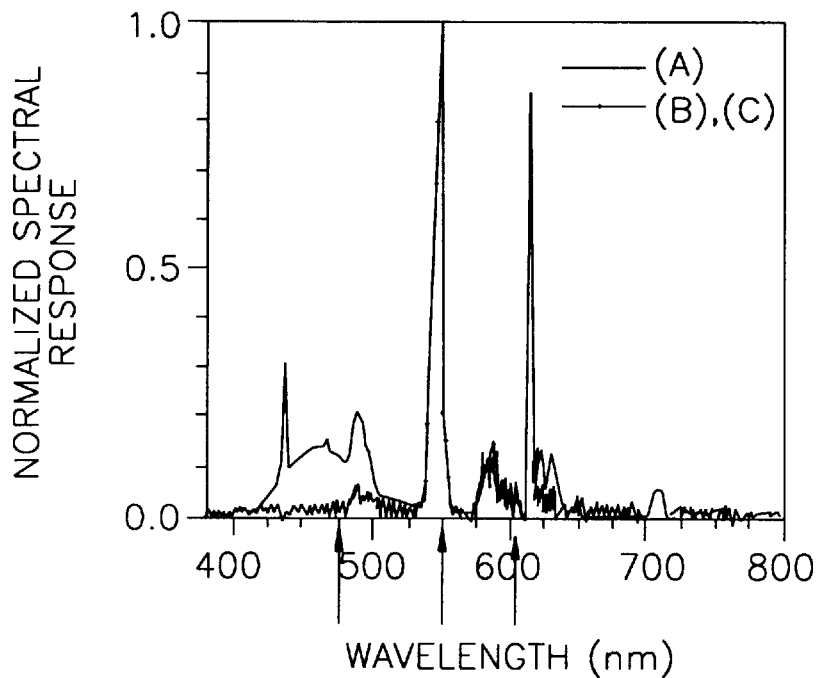
FIGS. 9A and 9B illustrate the normalized spectral response curve obtained from Step 1 of the simulation process, and the MTF obtained from weighted LSFs.
Figures 9B, 10:
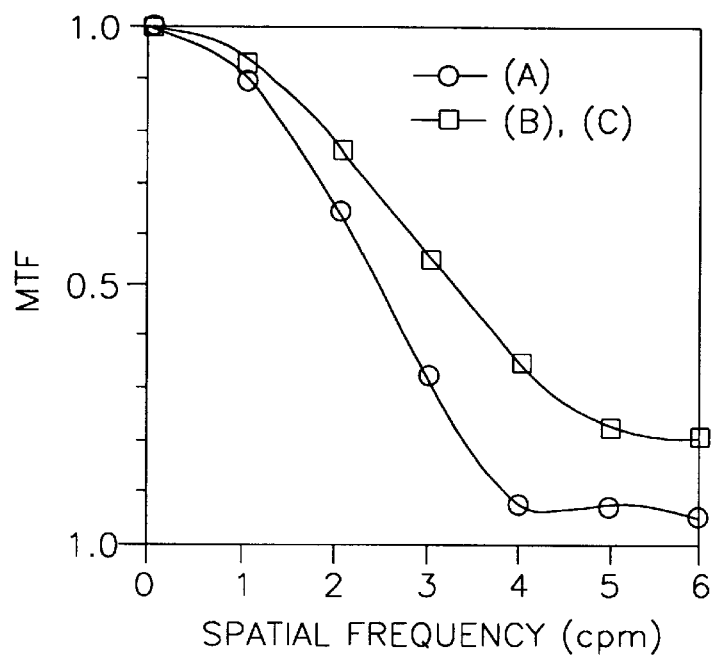
FIG. 10 shows the weighting factors for three detectors.

FIG. 8A illustrates the spectral distribution characteristics of a LCD, measured with a spectrophotometer (Spectro 320D, Instrument System). FIG. 8B shows the spectral transmission of the V(λ) filter measured with a spectrophotometer (Cary 5E, Varian) and the spectral response of the human eye and a CCD taken from articles entitled "Detector response and perfect-lens-MTF in polychromatic light," (Appl. Opt. 8, 607–616, 1969, by L. Levi) and "MOS multichannel detectors C4350, C4351," (T-2000, 1990, by Hamamatsu Technical Data). FIG. 9A illustrates the normalized spectral response curve obtained from Step 1 of the simulation process, and FIG. 9B illustrates the MTFs obtained from weighted LSFs. In FIGS. 9A and 9B, the plot indicated by (A) is for the case of using the CCD, and the plots indicated by (B) and (C) are for the cases of using the human eye and the CCD camera with V($\lambda$) filter. The weighting factors obtained in Step 4 and applied to the LSFs are shown in FIG. 10. In FIGS. 9A and 9B, the spectral response curve obtained using the CCD camera with V($\lambda$) filter (C) almost completely coincides with that measured by the human eye (B). It can be noticed that the spectral response of the CCD camera with V($\lambda$) filter is corrected for the human eye. As shown in FIG. 9B, the MTF curve for the simple CCD rapidly drops compared to the other detectors. This is because the FWHM of the spectral response curve for the simple CCD is broader than that for the others, as shown in FIG. 8B. Thus, to improve the accuracy in MTF measurement of a display, it is necessary to correct the response of the detector used to be like that of the human eye.

Hereinafter, a system for measuring the MTF according to the present invention, and experiments performed with the system will be described.

Figure 11:
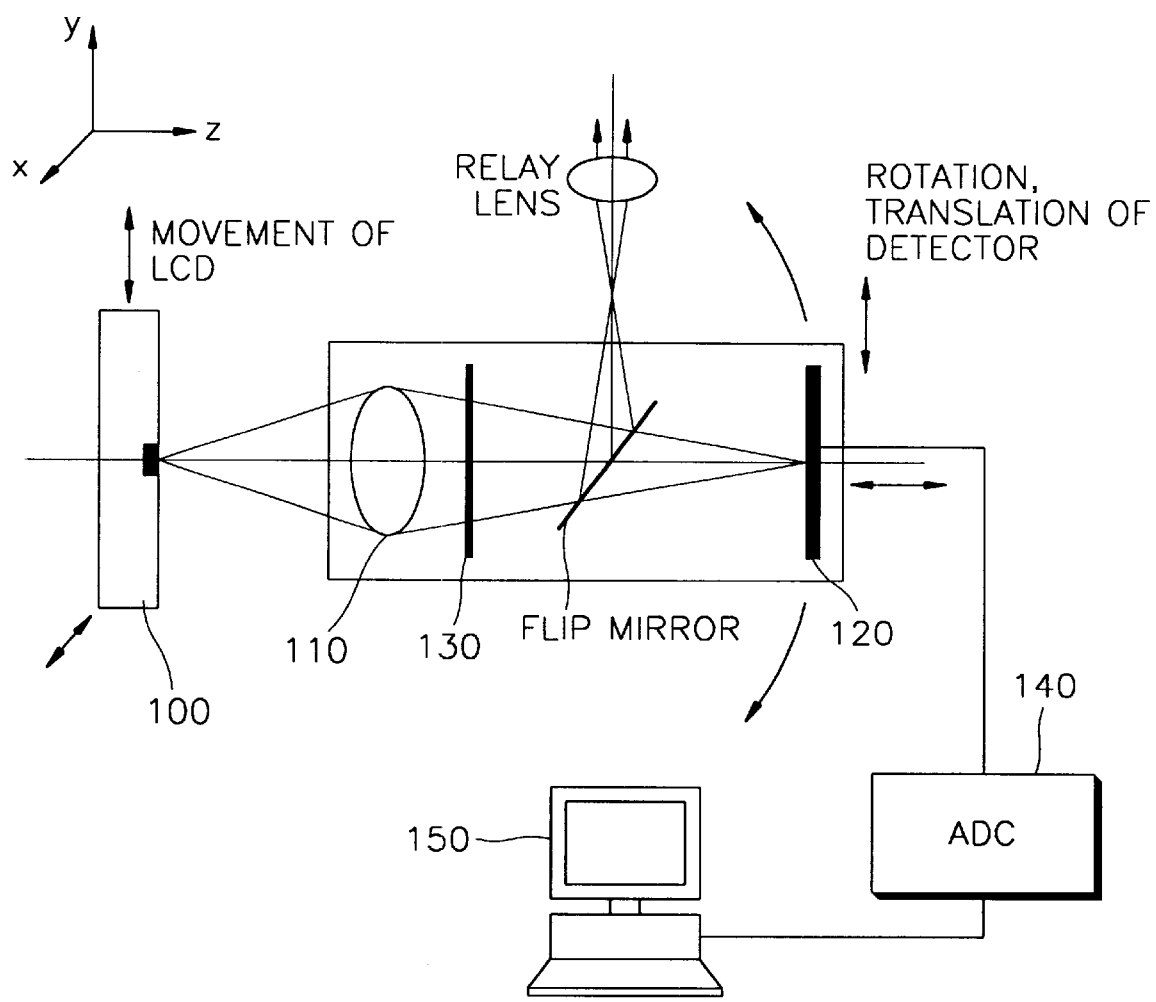
FIG. 11 is a schematic view of a system for measuring the MTF in a LCD according to the present invention.
Figure 12A:
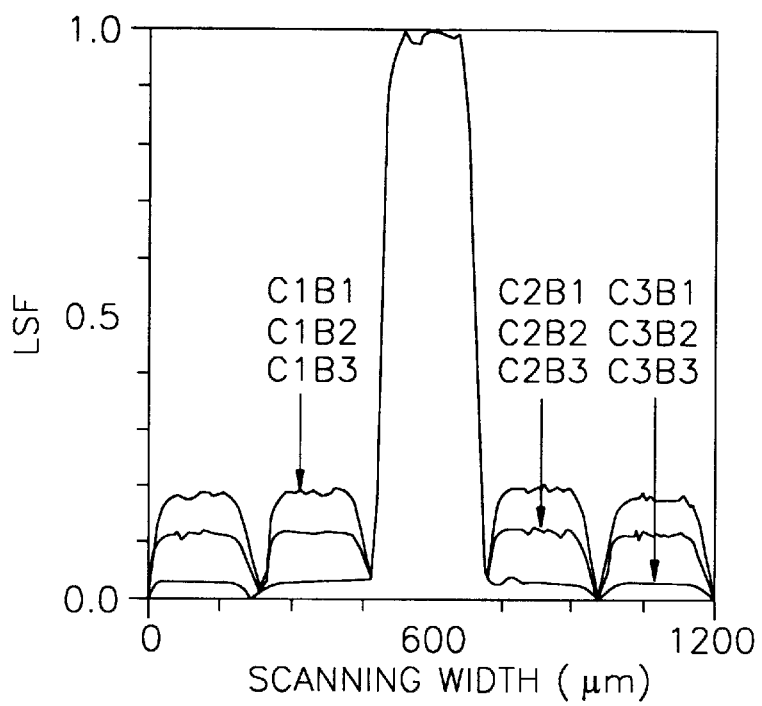
FIGS. 12A through 12D illustrate the LSFs and the MTFs measured in the vertical and horizontal directions for Sample A.
Figure 12B:
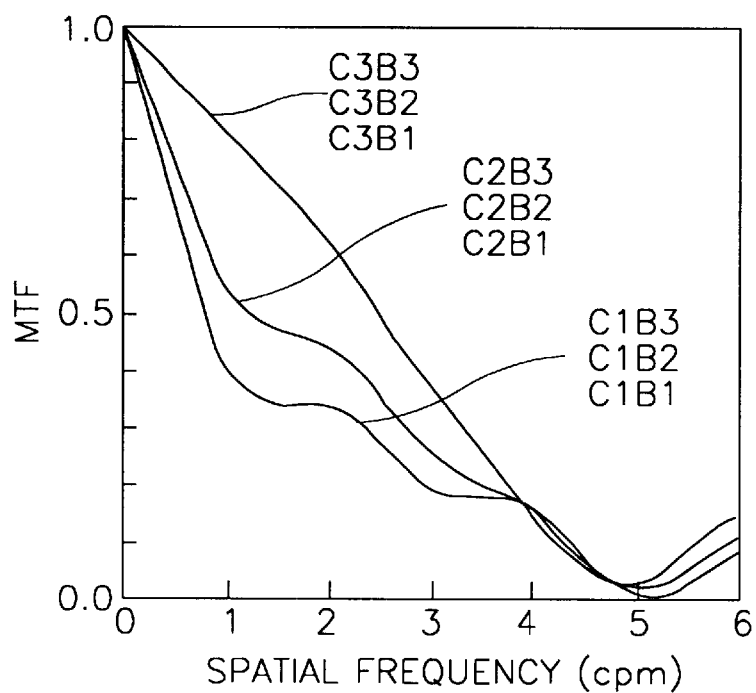
Figure 12C:
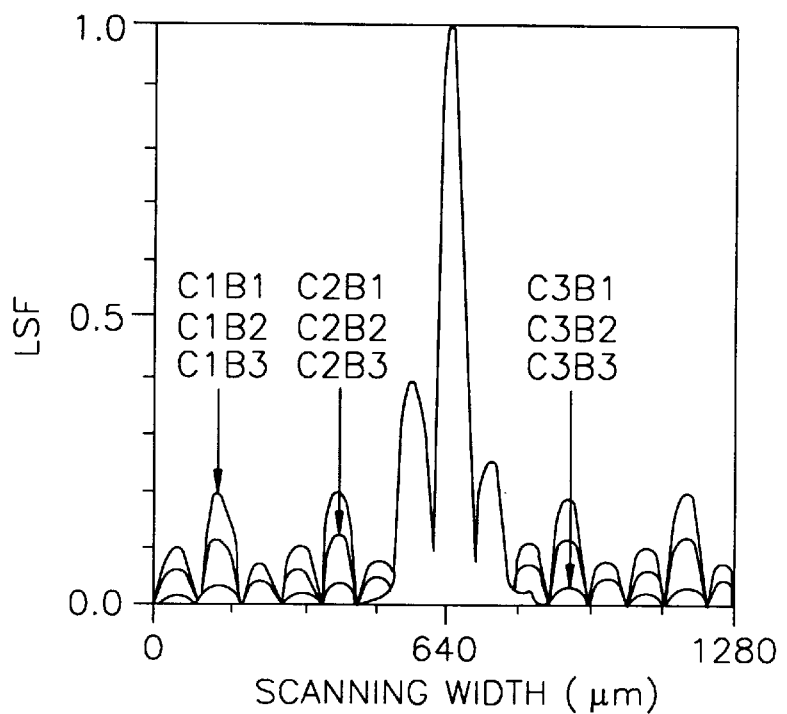
Figure 12D:
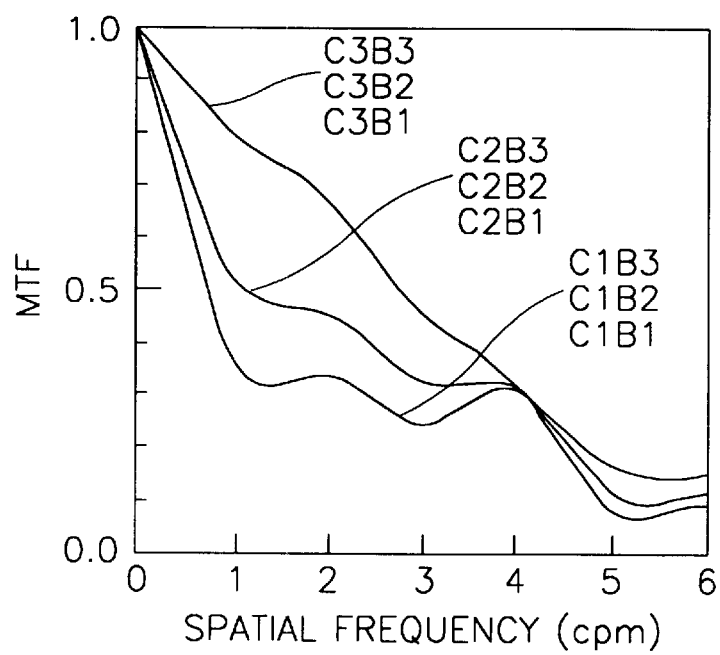

FIG. 11 is a schematic view of a system for measuring the MTF in an LCD according to the present invention. As shown in FIG. 11, the MTF measuring system includes a LCD 100 to be tested, a microscopic objective lens 110 (Spingler×10, numerical aperture (NA) =0.25), a linear CCD camera 130 equipped with a V($\lambda$) filter 120 (Hamamatsu S3904–512Q), and a personal computer 150. The microscopic objective lens 110 magnifies a white dot displayed on the LCD 100, and the linear CCD camera 130 captures the luminance distribution of the white dot. The luminance distribution of the white dot captured by the linear CCD camera 130 is digitized by a 12-bit ADC 140, and input to the personal computer 150. After correcting for the magnification of the objective lens 110, the MTF is obtained by Fourier transformation of LSF.

The measured MTF includes the MTFs for both the objective lens and the linear CCD camera, and thus the effects of these components should be corrected. The reproduction of higher spatial frequencies on LCDs with a sample structure is limited by aliasing effects. To avoid this, in the present embodiment, the video signal was prefiltered by the pixel width of the LCD used, to eliminate any frequency component above the Nyquist frequency from the video signal. Assuming that the pixel width is about equal to the center-to-center distance between two neighboring pixels, the Nyquist frequency is half the sampling frequency. The vertical and horizontal center-to-center distances for the color LCDs used in the present embodiment were 264 and 88 $\mu$m, respectively. The Nyquist frequencies were 2 and 6 cpm. The MTFs of the objective lens 110 and the linear CCD camera 130 at 6 cpm were 0.99 and 0.94, respectively. When the image magnified to ten times its original size by the objective lens 110 is imaged by the linear CCD camera 130, the MTF of the linear CCD camera 130 at the Nyquist frequency is increased by the magnification. In the present embodiment, both the MTFs of the objective lens 110 and the linear CCD camera 130 were more than 0.99 at frequencies below the Nyquist frequency, and thus correction was unnecessary.

The specifications of the two color LCDs used in the present embodiment are listed in FIG. 3. The scanning width was fixed at 1,280 $\mu$m. The measuring plane of the MTF was determined using an autofocus program to achieve reproducible measurements. The results of the measurement for the MTF were assessed using the modulation transfer function area (MTFA) algorithm. The MTFA is defined as:

$$MTFA = \int_0^{u_{max}} [MTF(u) - M_t(u)] du \quad (6)$$

where $$u = \frac{\pi}{180} lv, \quad (7)$$

$$\frac{1}{M_t(u)} = au\exp(-bu)[1 + c\exp(bu)]^{1/2}. \quad (8)$$

In the above formulae, u is the angular spatial frequency at the observer's eye in cycles per degree (cpd), l is the viewing distance in millimeters, and $u_{max}$ is given by the conditions:

$$u_{max} = \begin{cases} u_{NY} & \text{if } u_{NY} < u_c \\ u_{Ny} \text{ or } u_c & \text{if } u_{Ny} = u_c \\ u_c & \text{if } u_{Ny} > u_c \end{cases} \quad (9)$$

where $u_{Ny}$ is the Nyquist frequency of the LCD used and $u_c$ is the crossover frequency. The amplitude of MTF(u) equals $M_t(u)$, which is the modulation threshold function of the human eye, and a, b and c are given by:

$$a=440(1+0.7/L)^{-0.2} \quad (10)$$

$$b=0.3(1+100/L)^{0.15} \quad (11)$$

$$c=0.06 \quad (12)$$

In formulae (10) and (11), L is the display luminance in candles per square meter. The display luminance was measured with a luminance meter (LS-110, Minolta), and the viewing distance was assumed to be 500 mm. All measurements were performed in a dark room.

The influence of contrast and brightness level on the image quality was investigated. The measurements were made at the center of the screen. The LSFs and the MTFs measured in the vertical and horizontal directions for Sample A are shown in FIGS. 12A, 12B, 12C and 12D. The contrast control causes the MTF to vary because the contrast level influences the S/N ratio of LSF. Meanwhile, the MTF is independent of the luminance control which does not influence the S/N ratio of LSF.

FIG. 13 shows the MTFAs obtained from the measured MTFs. The MTFAs for both Samples A and B increase as the contrast and brightness levels increase. Thus, it can be noticed that the image quality of LCDs is better at higher contrast and brightness levels. The MTFAs at given contrast and brightness levels range from 17.42 to 21.38 for Sample B, and from 10.34 to 22.49 for Sample A. Thus, the influences of the contrast and brightness control on the image quality is greater for Sample A than for Sample B.

To evaluate the uniformity of resolution, measurements were carried out at five positions on the screen, according to ANSI/HFS 100–1988 ("American National for Human Factors Engineering of VDT Workstations," pp. 64–67, The Human Factor Society, Inc., Santa Monica, Calif. (1988)). The contrast and brightness levels were fixed at positions corresponding to the maximum MTFA of each LCD. The obtained MTFAs are shown in FIG. 14. It is more preferable to evaluate the image quality of an LCD from 5 positions (center, top left, top right, bottom left and bottom right). As shown in FIG. 14, the uniformity of Sample B is better than that of Sample A, although the mean MTFA of Sample A is somewhat higher.

As previously mentioned, the image quality of color CRTs can be accurately measured using the MTF measuring system according to the present invention, by setting the measurement conditions through computer simulation using a linear CCD camera with a V($\lambda$) filter. The resolution and the S/N ratio of the image displayed on the screen can be evaluated by measuring the MTF. Also, the present invention has solved the problem of truncation of the LSF by fixing the scanning width. The spectral response characteristics of detectors can be made like those of the human eye using the V($\lambda$) filter. The MTF measuring method according to the present invention can be effectively applied in evaluating the image quality of color CRTs.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A system for measuring a modulation transfer function (MTF) for use in evaluating the image quality of color liquid crystal displays (LCDs), the system comprising:

an objective lens for magnifying a white dot on the screen of a color LCD to be tested;

a charge coupled device (CCD) camera for capturing the luminance distribution of the white dot magnified by the objective lens;

an analog-to-digital converter (ADC) for converting analog information of the luminance distribution of the white dot captured by the CCD camera to digital information; and a controller for correcting magnification of the objective lens over the digital luminance distribution information of the white dot, and Fourier transforming a line spread function (LSF) according to the luminance distribution to measure the MTF;

wherein the CCD camera comprises a V($\lambda$) filter for modifying spectrum response characteristics of the CCD camera to closely approximate those of the human eye.

2. The system of claim 1, wherein the controller evaluates a signal-to-noise (S/N) ratio in the presence of background luminance (BL) of an image based on the measured MTF.

3. The system of claim 1, wherein the controller measures the MTF at a fixed scanning width.

4. A method for evaluating image quality of color liquid crystal displays (LCDs), comprising measuring a modulation transfer function (MTF) at a predetermined position on the screen of an LCD, wherein the measured MTF is used in the evaluation of the image quality, wherein the measurement of the MTF is performed by an objective lens for magnifying a white dot on the screen of an LCD to be tested, a charge coupled device (CCD) camera for capturing the luminance distribution of the white dot magnified by the objective lens, an analog-to-digital converter (ADC) for converting analog information of the luminance distribution of the white dot captured by the CCD camera to digital information, and a controller for correcting the magnification of the objective lens over the digital luminance distribution information of the white dot, and Fourier transforming a line spread function (LSF) according to the luminance distribution to measure the MTF, and wherein the CCD camera further comprises a V($\lambda$) filter for modifying spectrum response characteristics of the CCD camera to closely approximate those of the human eye.

5. A method for evaluating image quality of color liquid crystal displays (LCDs), using a modulation transfer function algorithm (MTFA) at a predetermined position on the screen of an LCD, wherein an MTFA measurement is performed by an objective lens for magnifying a white dot on the screen of a color LCD to be tested, a charge coupled device (CCD) camera for capturing a luminance distribution of a white dot magnified by the objective lens, an analog-to-digital converter (ADC) for converting analog information of the luminance distribution of the white dot captured by the CCD camera to digital information, and a controller for measuring the MTFA based on the digital luminance distribution information of the white dot, and wherein the CCD camera comprises a V($\lambda$) filter for modifying spectrum response characteristics of the CCD camera to closely approximate those of the human eye.

6. The method of claim 5, wherein the MTFAs are measured at the center, and upper and lower edges of the LCD, and the image quality is evaluated with results of MTFA measurements.

* * * * *